(12) United States Patent
Li et al.

(10) Patent No.: US 12,100,315 B2
(45) Date of Patent: Sep. 24, 2024

(54) PEER-INSPIRED STUDENT PERFORMANCE PREDICTION IN INTERACTIVE ONLINE QUESTION POOLS WITH GRAPH NEURAL NETWORK

(71) Applicant: The Hong Kong University of Science and Technology, Hong Kong (CN)

(72) Inventors: Haotian Li, Hong Kong (CN); Yong Wang, Hong Kong (CN); Huan Wei, Hong Kong (CN); Huamin Qu, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 758 days.

(21) Appl. No.: 17/343,769

(22) Filed: Jun. 10, 2021

(65) Prior Publication Data
US 2021/0398439 A1    Dec. 23, 2021

Related U.S. Application Data

(60) Provisional application No. 63/102,509, filed on Jun. 18, 2020.

(51) Int. Cl.
*G09B 7/02*     (2006.01)
*G06N 3/045*    (2023.01)
(Continued)

(52) U.S. Cl.
CPC ............ *G09B 7/02* (2013.01); *G06N 3/045* (2023.01); *G06N 3/047* (2023.01); *G06F 17/18* (2013.01);
(Continued)

(58) Field of Classification Search
CPC . G09B 7/02; G09B 7/04; G06N 3/045; G06N 3/047; G06N 3/08; G06N 3/04;
(Continued)

(56) References Cited

U.S. PATENT DOCUMENTS 10,296,512 B1 *  5/2019  Chandran ......... G06F 16/24578
10,354,544 B1 *  7/2019  Chernin ................... G09B 7/06
(Continued)

FOREIGN PATENT DOCUMENTS

CN   109816009 A   5/2019
CN   110717627 A   1/2020
(Continued)

OTHER PUBLICATIONS

Heng-Tze Cheng et al. "Wide & deep learning for recommender systems." Deep Learning for Recommender Systems, 2016, pp. 7-10.
(Continued)

*Primary Examiner* — Jack Yip
(74) *Attorney, Agent, or Firm* — Idea Intellectual Limited; Margaret A. Burke; Sam T. Yip (57) ABSTRACT

A method for predicting student performance in interactive question pools, comprising: a data processing and feature extraction module for: extracting from historical score data records statistical student features reflecting the students' past performances on the questions; and statistical question features indicating a question popularity of each question and the average students' scores on each question; and extracting from the pointing device movement data records a plurality of interactive edge features representing the characteristics of the students' problem-solving behaviors; a network construction module for: performing an Edge2Node transformation to transform the interactive edge features into one or more interaction nodes; and constructing a heterogeneous student-interaction-question (SIQ) network; and a prediction module for processing the SIQ network using a residual relational graph neural network to predict a student's score on unattempt questions.

8 Claims, 6 Drawing Sheets

(a) Mousedown      (b) Mousemove      (c) Mouseup

Click            Drag-and-drop (d) Example of mouse trajectories with drag-and-drop and click (51) Int. Cl.
*G06N 3/047* (2023.01)
*G06F 17/18* (2006.01)
*G06F 18/2413* (2023.01)
*G06N 3/04* (2023.01)
*G06N 3/08* (2023.01)
*G06Q 10/04* (2023.01)
*G06Q 50/20* (2012.01)
*G09B 7/04* (2006.01)

(52) U.S. Cl.
CPC ........... *G06F 18/2414* (2023.01); *G06N 3/04* (2013.01); *G06N 3/08* (2013.01); *G06Q 10/04* (2013.01); *G06Q 50/205* (2013.01); *G09B 7/04* (2013.01)

(58) Field of Classification Search
CPC ..... G06F 17/18; G06F 18/2414; G06Q 10/04; G06Q 50/205
See application file for complete search history.

(56) References Cited

U.S. PATENT DOCUMENTS

| | | | |
|---|---|---|---|
| 2009/0035733 A1* | 2/2009 | Meitar | G09B 7/00 434/118 |
| 2009/0075246 A1* | 3/2009 | Stevens | G09B 7/02 434/322 |
| 2013/0096892 A1 | 4/2013 | Essa et al. | |
| 2013/0288222 A1* | 10/2013 | Stacy | G09B 5/00 434/362 |
| 2014/0120516 A1* | 5/2014 | Chiang | G09B 5/02 434/362 |
| 2014/0279727 A1* | 9/2014 | Baraniuk | G09B 7/00 706/11 |
| 2014/0335497 A1* | 11/2014 | Gal | G09B 7/00 434/323 |
| 2015/0004588 A1* | 1/2015 | Vats | G09B 7/02 434/350 |
| 2015/0243176 A1* | 8/2015 | Zaslavsky | G06F 3/04842 434/322 |
| 2016/0217701 A1* | 7/2016 | Brown | G09B 7/00 |
| 2016/0293036 A1* | 10/2016 | Niemi | G09B 19/06 |
| 2018/0068404 A1 | 3/2018 | Mason et al. | |
| 2019/0294970 A1 | 9/2019 | Fidler et al. | |
| 2020/0074874 A1* | 3/2020 | Lathrop | G09B 7/04 |
| 2021/0133598 A1* | 5/2021 | Cha | G06N 5/04 |
| 2021/0133600 A1* | 5/2021 | Elewitz | G06Q 10/04 |
| 2021/0358317 A1* | 11/2021 | Faldu | G06F 18/2185 |
| 2022/0020283 A1* | 1/2022 | Dhavala | G09B 7/04 |
| 2023/0105077 A1* | 4/2023 | Dolsma | G06N 20/00 600/301 |

FOREIGN PATENT DOCUMENTS

| | | |
|---|---|---|
| CN | 110909942 A | 3/2020 |
| CN | 111126262 A | 5/2020 |
| WO | 2020058174 A1 | 3/2020 |

OTHER PUBLICATIONS

Penghe Chen et al. "Prerequisite-driven deep knowledge tracing." IEEE International Conference on Data Mining, 2018, pp. 39-48.
Ali Daud et al. "Predicting student performance using advanced learning analytics." International World Wide Web Conference Committee, 2017, pp. 415-421.
Nima Dehmamy et al. "Understanding the representation power of graph neural networks in learning graph topology." 33rd Conference on Neural Information Processing Systems, 2019, pp. 15387-15397.
Justin Gilmer et al. "Neural message passing for quantum chemistry." 34th International Conference on Machine Learning, 2017, pp. 1263-1272.
William L. Hamilton et al. "Inductive representation learning on large graphs." 31st Conference on Neural Information Processing Systems, 2017, pp. 1024-1034.
Qian Hu et al. "Academic performance estimation with attention-based graph convolutional networks." The 12th International Conference on Educational Data Mining, 2019, pp. 69-78.
Thomas N. Kipf et al. "Semi-supervised classification with graph convolutional networks." International Conference on Learning Representations (ICLR), 2017, pp. 1-14.
Yujia Li et al. "Gated graph sequence neural networks." International Conference on Learning Representations (ICLR), 2016, pp. 1-20.
Hao Peng et al. "Fine-grained event categorization with heterogeneous graph convolutional networks." International Joint Conference on Artificial Intelligence (IJCAI), 2019, pp. 3238-3245.
Chris Piech et al. "Deep knowledge tracing." Annual Conference on Neural Information Processing Systems (NeurIPS), 2015, pp. 505-513.
Zhiyun Ren et al. "Predicting performance on MOOC assessments using multi-regression models." International Conference on Educational Data Mining (EDM), 2016, pp. 484-489.
Michael Sejr Schlichtkrull et al. "Modeling relational data with graph convolutional networks." ESWC, 2018, pp. 593-607.
Nguyen Thai-Nghe et al. "Recommender system for predicting student performance." Recommender Systems for Technology Enhanced Learning, 2010, pp. 2811-2819.
Khushboo Thaker et al. "Comprehension factor analysis: Modeling student's reading behaviour: Accounting for reading practice in predicting students' learning in moocs." In International Conference on Learning Analytics & Knowledge, 2019, p. 111-115.
Xiao Wang et al. "Heterogeneous graph attention network." In International World Wide Web Conference Committee, 2019, pp. 2022-2032.
Huan Wei et al. "Predicting Student Performance in Interactive Online Question Pools Using Mouse Interaction Features." International Conference on Learning Analytics & Knowledge, 2020, pp. 645-654.
Chun-Kit Yeung et al. "Addressing two problems in deep knowledge tracing via prediction-consistent regularization." Annual ACM Conference on Learning at Scale, 2018, pp. 1-10.
Rex Ying et al. "Graph convolutional neural networks for web-scale recommender systems." Special Interest Group on Knowledge Discovery and Data Mining, 2018, pp. 974-983.
Jie Zhou et al. "Graph neural networks: A review of methods and applications." AI Open, 2020 (1), pp. 57-81.
Notice of Allowance of the corresponding China patent application No. 202110676427.3 mailed on Dec. 12, 2023.
Xu Youxiang et al., "MOOC grades prediction model based on graph convolution," Video Engineering, vol. 18, 2019.

* cited by examiner

PEER-INSPIRED STUDENT PERFORMANCE PREDICTION IN INTERACTIVE ONLINE QUESTION POOLS WITH GRAPH NEURAL NETWORK

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES WITH RELATED DOCUMENTS

The present application claims priority to U.S. Patent Application No. 63/102,509 filed Jun. 18, 2020; the disclosures of which are incorporated herein by reference in their entirety.

FIELD OF THE INVENTION

The present invention is generally related to techniques of using deep neural networks in the prediction of students' test performances in interactive questions.

BACKGROUND

Graph Neural Networks (GNNs) are deep neural networks adapted from the widely-used Convolutional Neural Networks (CNNs) and specifically designed for graphs and graphical data. They have shown powerful capability in dealing with complicated relationships in a graph and some representative works are documented in papers such as: Thomas N. Kipf and Max Welling, "Semi-supervised Classification with Graph Convolutional Networks", The International Conference on Learning Representations, 2017; William L. Hamilton, Zhitao Ying, and Jure Leskovec, "Inductive Representation Learning On Large Graphs", Conference on Neural Information Processing Systems, 2017; Michael Sejr Schlichtkrull, Thomas N. Kipf, Peter Bloem, Rianne van den Berg, Ivan Titov, and Max Welling, "Modeling Relational Data With Graph Convolutional Networks", Extended Semantic Web Conference, pages 593-607, 2018; Justin Gilmer, Samuel S. Schoenholz, Patrick F. Riley, Oriol Vinyals, and George E. Dahl, "Neural Message Passing for Quantum Chemistry", The International Conference on Machine Learning, pages 1263-1272, 2017; Yujia Li, Daniel Tarlow, Marc Brockschmidt, and Richard S. Zemel, "Gated Graph Sequence Neural Networks" The International Conference on Learning Representations, 2016; and Xiao Wang, Houye Ji, Chuan Shi, Bai Wang, Yanfang Ye, Peng Cui, and Philip S. Yu, "Heterogeneous Graph Attention Network", The World Wide Web Conference, pages 2022-2032, 2019. These papers are incorporated herein by reference in their entireties. Among them, some works are especially designed for handling heterogeneous graphs while others aim to perform graph convolutions on graphs with multi-dimensional edge features. However, there are few works on heterogeneous graphs with multi-dimensional edge features.

GNNs have been applied in various applications such as recommender systems, social networks analysis, and molecular property predictions. Very few applications can be found in the field of online learning and education. A recent work on college education by Qian Hu and Huzefa Rangwala, "Academic performance estimation with attention-based graph convolutional networks", Education Data Mining, 2019 proposed a GNN-based approach called Attention-based Graph Convolutional Network (AGCN) which utilizes a GCN to learn graph embedding of the network of frequently taken prior courses and then applies attention mechanism to generate weighted embedding for final predicted grades. However, this method is limited to handling graphs with only one type of nodes (i.e., courses) and edges (i.e., the connection of courses taken in continuous two semesters), which cannot be applied to student performance prediction in interactive online question pools due to their intrinsically complex relationship among questions and students.

Student performance prediction is an important task in educational data mining. For example, it can contribute to recommending learning material and improving student retention rates in online learning platforms. According to the study documented in Qian Hu and Huzefa Rangwala, "Academic Performance Estimation with Attention-Based Graph Convolutional Networks", Educational Data Mining, 2019, prior studies on student performance prediction includes primarily static models and sequential models. And static models refer to traditional machine learning models that learn the static patterns of student features and further make predictions on student performances. On the other hand, sequential models are proposed to better capture the temporal evolutions in students' knowledge or the underlying relationship between learning materials.

Recurrent neural networks (RNNs) may also be used to extract from a sequence of students' problem-solving records the hidden knowledge and model their knowledge evolution. However, sequential models cannot be directly applied to student performance prediction in a certain problem in an interactive online question pools, because the sequential models aim to track students' knowledge evolution in an area and predict the students' performance in a cluster of problems in the that area. Thus, if these sequential models are to be used to predict question-level performance, each area may only consist of one question and as such the tracking of students' knowledge evolution is not applicable. Without information of students' knowledge level, the prediction becomes inaccurate.

A recent study documented in Huan Wei, Haotian Li, Meng Xia, Yong Wang, and Huamin Qu, "Predicting Student Performance in Interactive Online Question Pools Using Mouse Interaction Features", ArXiv:2001.03012, 2020 predicted student performance in interactive online question pools by introducing new features based on student mouse movement interactions to delineate the similarity between questions. The approach, however, implicitly requires that the questions must have similar question structure designs and involve drag-and-drop mouse interactions, which may not always hold.

Therefore, there is an unmet need for a more general approach for student performance prediction in interactive online question pools that can work for question pools with several hundred or thousand questions of different types.

SUMMARY OF THE INVENTION

In accordance to various embodiments of the present invention, provided is a novel GNN-based approach to predict student performance in interactive online question pools. The novel GNN is the residual relational graph neural network (R²GCN). The model architecture is adapted from relational-GCN (R-GCN) and further incorporates a residual connection to different convolutional layers and original features.

More specifically, in arriving at the present invention, a heterogeneous large graph is built, which comprises a plurality of questions, representative data of a plurality of students, and data of the interactions between the students and the questions, to extensively model the complex relationship among different students and questions. Then, a student performance prediction is formalized as a semi-supervised node classification problem on this heterogeneous graph. The classification results are the student score levels (i.e., 4 score levels) on each question. In addition, user pointing device (i.e., mouse, trackpad, trackball, etc.) movement features are introduced to better delineate student-question interactions.

BRIEF DESCRIPTION OF THE DRAWINGS

Embodiments of the invention are described in more details hereinafter with reference to the drawings, in which.

DETAILED DESCRIPTION OF THE INVENTION

In the following description, methods for student performance prediction in interactive question pools and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
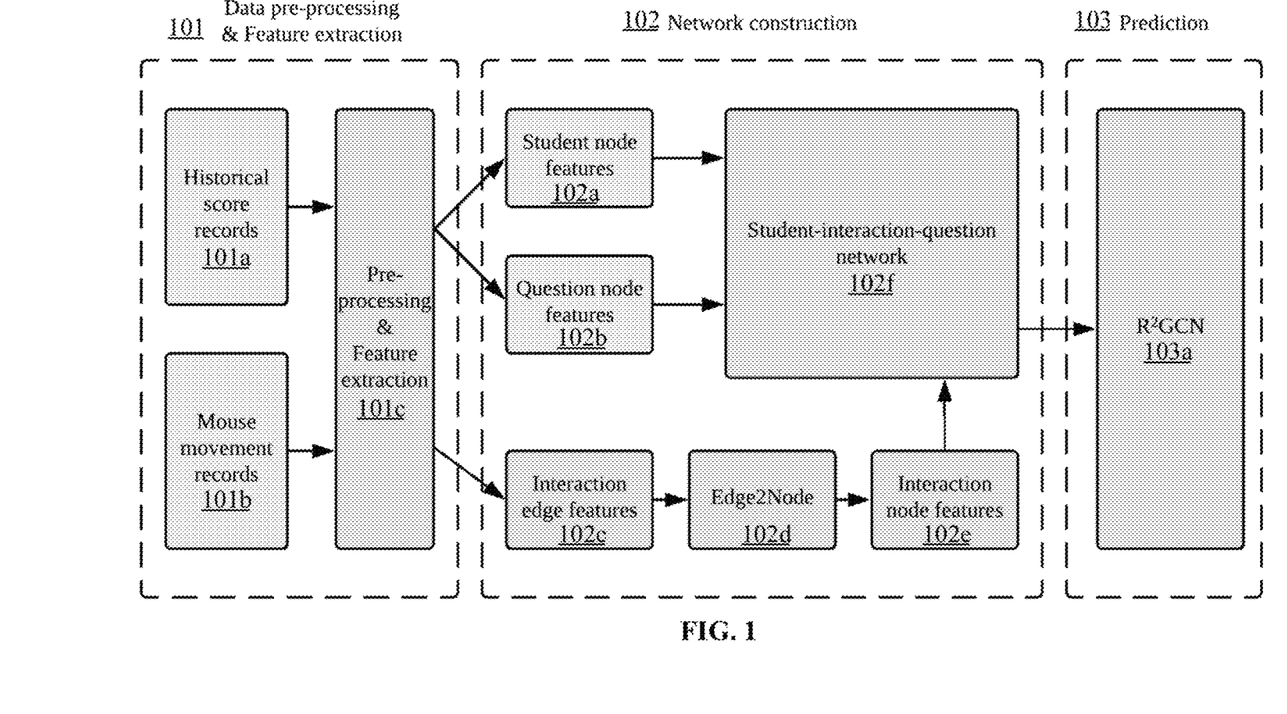
FIG. 1 depicts a logical block and dataflow diagram of a method for student performance prediction in interactive question pools according to an embodiment of the present invention.

In accordance to one aspect of the present invention, provided is a method for student performance prediction in interactive online question pools that is peer-inspired in that it extensively considers the historical problem-solving records of both a student and his/her peers (i.e., other students working on the question pool) to better model the complex relationships among students, questions, and student performances, and to further enhance student performance prediction. FIG. 1 shows the framework of the method, which comprises three major logical process execution modules: a data processing and feature extraction module (101), a network of nodes construction module (102), and a prediction module (103). The module of data processing and feature extraction (101) is to pre-process related data and extract features (101c) from the historical student question-answer score data records (101a) and pointing device (i.e., mouse, trackpad, trackball, etc.) movement data records (101b) corresponding to the historical student question-answer score data records for further processing in the network of nodes construction and the student performance prediction. Three types of features are extracted and considered: statistical student features reflecting students' past performance in answering the questions (shown as student node features (102a)), statistical question features indicating the question popularity of each of the questions and the average students' scores on each of the questions (shown as question node features (102b)), and interaction edge features (102c) representing the characteristics of students' problem-solving behaviors. The network construction module (102) builds a network (102f) from the three types of features to extensively model the various performance of different students on different questions. Finally, the constructed network is input into the prediction module (103). The prediction module (103) comprises using a residual relational graph neural network (R²GCN) (103a), of which the model architecture is adapted from relational-GCN (R-GCN), to predict a student's score level on the unattempt questions in the interactive online question pool by adding residual connections to hidden states.

In accordance to another aspect of the present invention, the method for student performance prediction in interactive online question pools is executed by an apparatus comprising one or more computer-readable media; and one or more processors that are coupled to the one or more computer-readable media. The one or more processors are then configured to execute the data processing and feature extraction module (101), the network of nodes construction module (102), and the prediction module (103).

In accordance to one exemplary embodiment, the statistical student features and statistical question features listed respectively in Table 1 and Table 2 below are extracted from historical score records. Statistical student features comprise primarily students' past performance on various types of questions to reflect the students' ability on a certain type of questions, for example, average score of first trials on numeric questions of grade 8 and difficulty 3. Statistical question features show the popularity and real difficulty level of them, for example, the proportion of trials getting 4 on the question.

TABLE 1

| Feature Name | Explanation | Example |
|---|---|---|
| # Total trials | Number of a student's total trials | — |
| # 2$^{nd}$ trials | Number of a student's 2$^{nd}$ trials | — |
| % Trials in [math dimension × grade × difficulty] | Percentages of trials on questions of certain math dimension, grade and difficulty | % Trials on spatial questions of grade 5 and difficulty 5 |
| Mean 1$^{st}$ score in [math dimension × grade × difficulty] | Mean scores of 1$^{st}$ trials on questions of certain math dimension, grade and difficulty | Mean 1$^{st}$ score on numeric questions of grade 8 and difficulty 3 |

TABLE 2

| Feature Name | Explanation | Example |
|---|---|---|
| Math dimension | A question's related knowledge topic | Numeric |
| Grade | A question's target grade for students | 12 |
| Difficulty | A question's difficulty level | 4 |
| # Total trials | Number of trials made on a question | — |
| # 2$^{nd}$ trials | Number of 2$^{nd}$ trials made on a question | — |
| % Trials in [score level] | Percentage of trials in each score level achieved on a question | % Trials getting 4 |

In accordance to one embodiment of the present invention, a grade indicated the targeted grade for a student on a particular question. A difficulty is an index representing easy to hard of a particular question. A mathematical dimension is a fuzzy mathematical concept representing the knowledge topic tested in a particular question.

Figure 2:
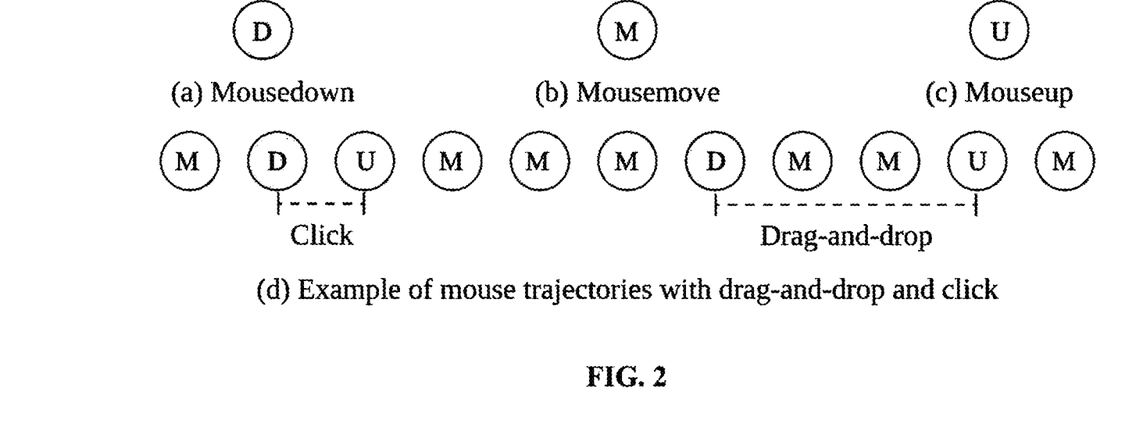
FIG. 2 depicts an illustration of exemplary pointing device movements in a pointing device movement trajectory processed by the method for student performance prediction in interactive question pools according to an embodiment of the present invention.

In accordance to one embodiment of the present invention, two types of pointing device movements are considered in the interactions with the questions in the interactive online question pools: click and drag-and-drop. However, despite their differences, both of them start with the movement event, "mousedown", and end with the movement event, "mouseup", as illustrated in FIG. 2. Thus, the occurrence of a pair of necessary "mousedown" and "mouseup" pointing device movement events in a pointing device movement trajectory when a student is interacting with (i.e., answering) a question can be generalized as a "general click" (GC), and a set of interactive edge features is provided, as listed in Table 3 below.

TABLE 3

| Feature Name | Explanation |
|---|---|
| 1$^{st}$GCTimeLength | Time length between when the question is first shown to the student and when the 1$^{st}$ GC is made |
| 1$^{st}$GCTimePercent | Percentage of the time length of the 1$^{st}$ GC in the entire time length spent on answering the question by the student |
| 1$^{st}$GCEventStartIdx | Number of pointing device movement events when the question is first shown to a student and before the 1$^{st}$ GC on the question answered by the student |
| 1$^{st}$GCEventPercent | Percentage of pointing device movements made when the question is first shown to a student and before the 1$^{st}$ GCs on the question answered by the student |
| 1$^{st}$GCEventEndIdx | Number of pointing device events before the 1$^{st}$ GC ends |
| GCCount | Total number of GCs made on the question answered by the student |
| GCPerSecond | Average number of GCs made on the question answered by the student per second |
| AvgTimeStwGC | Average time between GCs made on the question answered by the student |
| MedTimeStwGC | Median of time between GCs made on the question answered by the student |

TABLE 3-continued

| Feature Name | Explanation |
|---|---|
| StdTimeStwGC | Standard deviation of time between GCs made on the question answered by the student |
| OverallDistance | Total pointing device trajectory length |
| InteractionHour | Point of time when the student answers the question, e.g., 13:00 |

These features are mainly designed to reflect the first GCs made by students when trying to answer the questions. First GCs can reveal information of questions, for example, the required types of pointing device movement interaction. Also, they reflect the problem-solving and learning behavior of students, for example, reading the description first before answering, guessing the answer first before reading the question description in detail, thinking time before answering the question.

Figure 3A:
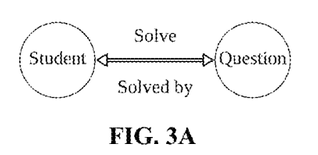
FIG. 3A depicts an illustration of an exemplary problem-solving network of nodes.
Figure 3B:
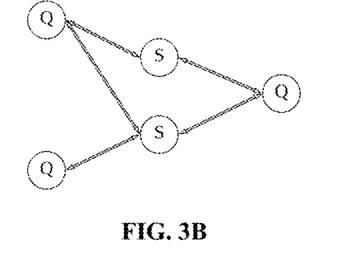
FIG. 3B depicts an illustration of another exemplary problem-solving network of nodes.

It is challenging to model the relationships among the questions in an interactive online question pool, since there is no curriculum or predefined question order that every student needed to follow, which would have been helpful for modelling the relationships among questions As such, students' pointing device movement interactions with the attempted questions are used as a bridge to construct the dependency relationships among different questions and build a problem-solving network. When conducting performance prediction for a student, the pointing device movement records of his/her peers (i.e., other students) are all considered. FIGS. 3A and 3B illustrate a problem-solving network, which is a heterogeneous network with multi-dimensional edge features comprising student nodes (S), question nodes (Q), and interaction edges with the multi-dimensional pointing device movement features mentioned above.

Figure 3C:
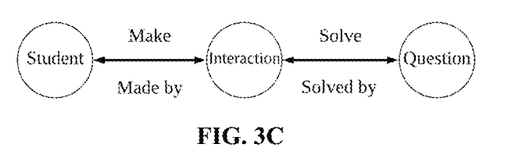
FIG. 3C depicts an illustration of an exemplary student-interaction-question (SIQ) network of nodes according to an embodiment of the present invention.
Figure 3D:
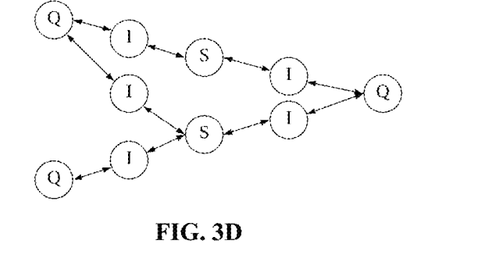
FIG. 3D depicts an illustration of another exemplary student-interaction-question (SIQ) network of nodes according to an embodiment of the present invention.

However, there is no GNN model designed for such kind of heterogeneous networks. Inspired by the technique of breaking up edges and transforming a homogeneous network to a bipartite network disclosed in Jie Zhou, Ganqu Cui, Zhengyan Zhang, Cheng Yang, Zhiyuan Liu, and Maosong Sun, "Graph Neural Networks: A Review of Methods and Applications", ArXiv:1812.08434, 2018 (the disclosure of which is incorporated herein by reference in its entirety), an Edge2Node transformation (102$d$) is performed to transform the pointing device movements among the students and the questions (interaction edge features (102$c$)) into "fake nodes" (interaction nodes (102$e$)). The interaction nodes (102$e$), along with student nodes (102$a$) and question nodes (102$b$), are then used to build a student-interaction-question (SIQ) network (102$f$) in accordance to one embodiment of the present invention to model the complex relationships among different students, questions, and interactions thereof, which is also shown in FIGS. 3C and 3D. The SIQ network (102$f$) forms the basis of applying R$^2$GCN to student performance prediction in interactive online question pools.

Figure 4:
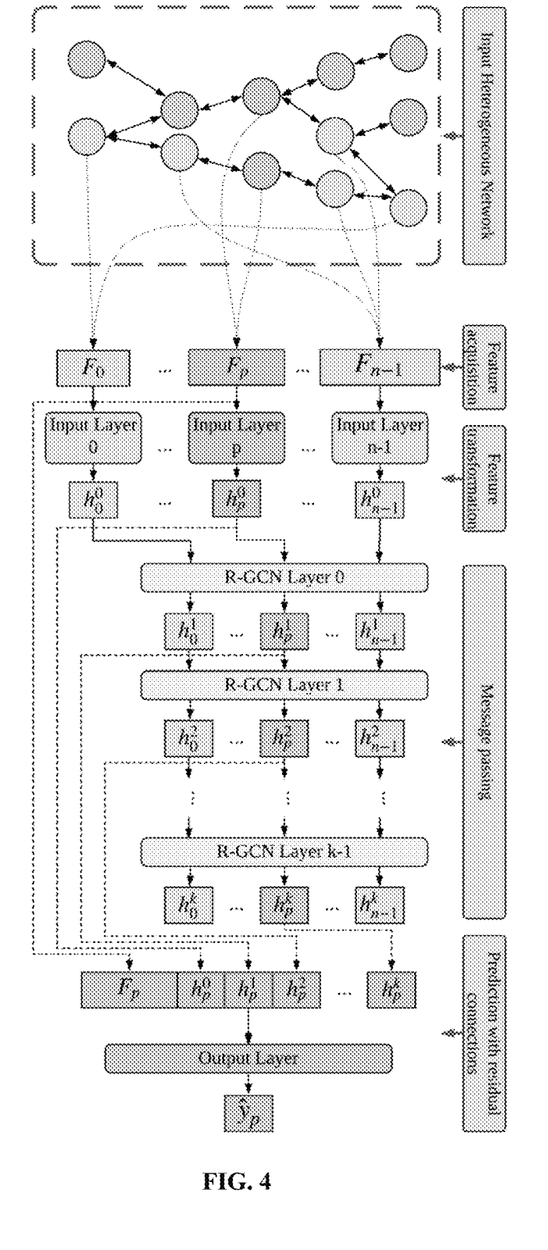
FIG. 4 depicts a logical architecture diagram of a R²GCN according to an embodiment of the present invention.

FIG. 4 shows the logical architecture of the R$^2$GCN in accordance to one embodiment of the present invention. The R$^2$GCN comprises one or more parallel input layers for feature transformation of different types of nodes into nodes of the same shape (i.e., from nodes having different lengths of features to nodes having the same feature length); one or more of consequential R-GCN layers for message passing; one or more residual connections to one or more hidden states and original features for capturing different levels of information; and an output layer for final prediction. In the following, n (as shown in FIG. 4 as well), p (as shown in FIG. 4 as well), and R (not shown in FIG. 4) represents the number of node type, the target type of nodes, and the collection of all edge types respectively in the input heterogeneous network.

In the $R^2GCN$, a message function is provided for transmitting and aggregating messages from all neighboring nodes $N_i$ to center node i in the message passing. In each R-GCN layer, the received message $M_i^{(l+1)}$ of node i in layer l+1 is defined as:

$$M_i^{(l+1)} = \Sigma_{r \in R} \Sigma_{j \in N_i^r} w_{i,j} W_r^{(l)} h_j^{(l)}; \quad (1)$$

where $W_r$ is the weight matrix of relation r; $h_j^{(l)}$ is the hidden state of node j after layer l; and $w_{i,j}$ indicates the weight of the message from node j. An averaging function is used to reduce the messages transmitted on the same type of edges. A summing function is used to reduce messages transmitted on different types of edges. $w_{i,j}$ is set as the multiplicative inverse of number of nodes in $N_i^r$.

In the $R^2GCN$, an update function is provided for updating the center node i's hidden state $h_i^{(l)}$ after layer l with the message $M_i^{(l+1)}$ generated by Equation (1) in the message passing. To preserve the original hidden state of the center node i, the update function is defined as:

$$h_i^{(l+1)} = \sigma(M_i^{(l+1)} + W_0^{(l)} h_i^{(l)} + b); \quad (2)$$

where $W_0$ denotes the weight matrix of the center node i's hidden state; b denotes the bias; and $\sigma$ is the activation function.

In the $R^2GCN$, a readout function is provided for transforming the final hidden state to the prediction result. Different from the original R-GCN model, the readout function of $R^2GCN$ adds residual connections to both hidden states and original features. The readout function for node $p_i$ of type p is defined as:

$$\hat{y}_{p_i} = f(\text{Concat}(F_{p_i}, h_{p_i}^0, h_{p_i}^1, \ldots, h_{p_i}^k)); \quad (3)$$

where $\hat{y}_{p_i}$ is the predicted result, f is the function to transform the concatenated hidden states to final result; $F_{p_i}$ denotes the original input features of the corresponding question node; and k represents the number of consequential R-GCN layer.

EXAMPLES

An embodiment of the present invention was implemented and experimented on a real-world dataset collected from an online interactive question pool called LearnLex (https://www.learnlex.com).

Data Description:

At the time of the implementation and performance of the experiment, LearnLex contained around 1,700 interactive mathematical questions and had served more than 20,000 K-12 students since 2017. Different from questions provided on most other Massive Open Online Course (MOOC) platforms, the interactive questions could be freely browsed and answered by students without predefined orders and were merely assigned fuzzy labels, grades, difficulties, and mathematical dimensions. A grade indicated the targeted grade of a student and ranges from 0 to 12. A difficulty was an index of five levels (i.e., 1 to 5) representing easy to hard assigned by question developers. A mathematical dimension was a fuzzy mathematical concept representing the knowledge tested in the question.

Figure 5A:
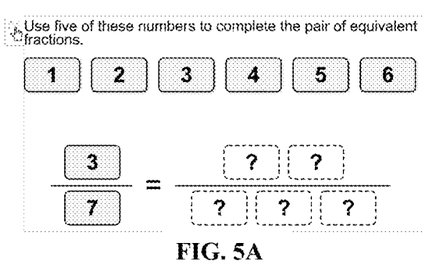
FIG. 5A depicts an exemplary interactive question that requires a pointing device action of drag-and-drop.
Figure 5B:
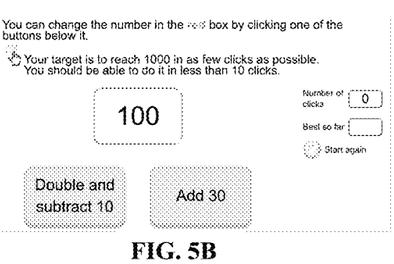
FIG. 5B depicts another exemplary interactive question that requires a pointing device action of click.

Apart from these labels, the pointing device (mouse) movement interactions of students in their problem-solving process were also collected. According to the empirical observations made in the experiment, there were mainly two types of mouse movement interactions during students' problem-solving processes: drag-and-drop and click. FIG. 5A shows an exemplary question that requires a pointing device action of dragging the blocks at the top to appropriate locations. FIG. 5B shows another exemplary question that asks students to click the buttons to complete a given task.

When a student finished a question, the LearnLex platform assigned a discrete score between 0 and 100 to the submission. The possible scores of a question were a fixed number of discrete values depending on what percentage a student correctly answers the question, and the majority of the questions had at most four possible score values. Therefore, the raw scores in historical score records were mapped to four score levels (0-3) to guarantee a consistent score labeling across questions. Also, only the score of a student's first trial on a question was considered in the experiment.

In the experiment, both the historical score records and the mouse movement records were collected. There were 973,676 entries from Sep. 13, 2017 to Jan. 7, 2020 in the historical score records, and each entry included a score value, a student ID, a question ID, and a timestamp. The mouse movement records contained the raw device events (i.e., mouse-move, mouse-up, and mouse-down), the corresponding timestamps, and positions of mouse events of all the students working on the interactive online question pool from Apr. 12, 2019 to Jan. 6, 2020. A mouse trajectory is a series of raw mouse events that are generated during a student's problem-solving process. In total, 104,113 pointing device trajectories made by 4,020 students on 1,617 questions were collected.

Data Processing

In the experiment, a portion of the original dataset with records from Apr. 12, 2019 to Jun. 27, 2019 was extracted (denoted as "short-term" dataset) for extensively evaluating the proposed approach in terms of prediction accuracy, influence of labeled dataset size, and influence of topological distance between questions in training, validation, and test set. In the short-term dataset, there were in total 43,274 mouse trajectories made by 3,008 students on 1,611 questions. Taking into account that too few labeled data would make it difficult to train the GNN models, experiments were conducted only on the students who have finished at least 70 questions. Therefore, 47 students were counted in the short-term dataset. In addition, all the records from Apr. 12, 2019 to Jan. 6, 2020 (denoted as long-term dataset) were used to further evaluate the performance of the embodiment of the present invention. The range of filtered students was extended to include those who have finished at least 20 questions. Thus, there were in total 1,235 students in this dataset.

For each student s, his/her 70% problem-solving records in the early time period was used as the training dataset, the next 15% records as the validation set and the last 15% as the test set. During the processing of the dataset, the split timestamp between training and validation set was recorded as $t_1^s$ and the split timestamp between validation and test set was recorded as $t_2^s$. With two timestamps, the SIQ network for student was then built with all students' problem-solving records between Apr. 12, 2019 and $t_1^s$. Therefore, each student has a personalized network of different sizes, which was helpful for providing better performance prediction for different students. When constructing the SIQ network, only the questions that were answered once during the period between Apr. 12, 2019 and $t_1^s$ were considered. Their SIQ networks were built with all available students' records between Apr. 12, 2019 and $t_1^s$. All the statistical features assigned to student and question nodes in SIQ network were constructed with records before Apr. 12, 2019. Since $t_1^s$ was always later than that date, leakage of validation and test data in training process was avoided.

Baselines

Figure 6:
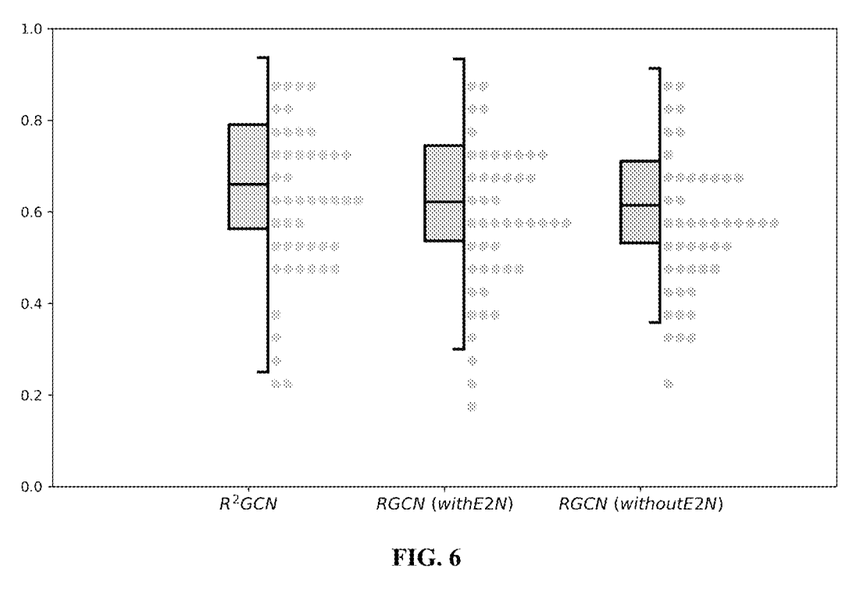
FIG. 6 depicts an illustrative graph of prediction results of students' scores on interactive questions using the R²GCN according to an embodiment of the present invention and two other GNNs.

The present invention was compared with both the state-of-the-art GNN models and other traditional machine learning approaches for student performance prediction in order to extensively evaluate the performance of the present invention. These baselines are as follows:

R-GCN: a classical GNN model proposed for networks with various types of edges. Referring to FIG. 6. The R-GCN was tested with two variants of input network. R-GCN (without E2N) denotes the input of R-GCN model being a problem-solving network without edge features; R-GCN (with E2N) denotes the input being a SIQ network with Edge2Node transformation.

GBDT: a tree model utilizing the ensemble of trees. To verify the effectiveness of integrating peer information into student performance prediction in our approach, only the statistical features of students and questions in GBDT were considered.

SVM: a model constructing a hyperplane or hyperplanes to distinguish samples. Similar to GBDT, only statistical features of students and questions were fed into SVM.

LR: a classical linear model with a logistic function to model dependent variables. Only the statistical features were used for LR.

Detailed Implementation

The GNN models in accordance to the embodiments of the present invention and used in the experiment were mainly implemented using PyTorch and DGL, while the GBDT, the LR, and the SVM were implemented with Sci-kit Learn. For the $R^2GCN$ implemented and used in the experiment, three parallel input layers were used to transform original features of three types of nodes, similar to that as illustrated in FIG. 4. Then three sequential R-GCN layers were used with a hidden size of 128. The final two layers of the $R^2GCN$ were fully-connected neural networks with a hidden size of 128. The activation function used was ReLU. All GNN-based models used Adam as the optimizer and cross entropy as the loss function. The learning rate was empirically set as 1e-4 and weight decay rate as 1e-2. The early stopping mechanism was applied to the GNN models. The maximum number of training epochs was set at 400 and the early stopping patience was set at 100 epochs. For the GBDT, the number of trees was set at 250, the max depth at 5, and the learning rate as 1e-3. For the SVM, a Radial Basis Function (RBF) kernel was used, and the regularization parameter was set at 1. To gain a reliable result, every model was trained and tested for ten times and reported the average performance.

Evaluation Metrics

Three different metrics were used to evaluate models comprehensively. Here, s, $n_c^s$, $n^s$, $W-F1^s$ are used to denote a student, the number of his/her correctly predicted questions, the number of questions in his/her test set, and the weighted F1 of his/her prediction results.

Average personal accuracy (AP–Acc) evaluates a model's average prediction accuracy on different students:

$$AP - Acc = \frac{1}{N} \times \sum_{s=1}^{N} \frac{n_c^s}{n^s}. \qquad (4)$$

Overall accuracy (O–Acc) evaluates a model's average prediction accuracy on all predicted questions:

$$O - Acc = \Sigma_{s=1}^{N} n_c^s / \Sigma_{i=1}^{N} n^s \qquad (5)$$

Average personal weighted F1 (APW–F1) evaluates a model's average weighted F1 score on different students:

$$APW - F1 = \frac{1}{N} \times \sum_{s=1}^{N} W - F1^s. \qquad (6)$$

Short-Term Dataset

Prediction Accuracy

Table 4 below shows the results of the experiment conducted. Among all the methods, the $R^2GCN$ model performed the best across different metrics, which demonstrated the effectiveness of the embodiments of the present invention, and outperformed all traditional machine learning models.

TABLE 4

| Model | AP-Acc | O-Acc | APW-F1 |
| --- | --- | --- | --- |
| $R^2GCN$ | 0.6642 | 0.6662 | 0.6148 |
| R-GCN (with E2N) | 0.6302 | 0.6331 | 0.5737 |
| R-GCN (without E2N) | 0.6151 | 0.6198 | 0.5508 |
| GBDT | 0.5687 | 0.5750 | 0.4398 |
| SVM | 0.5734 | 0.5805 | 0.4470 |
| LR | 0.5928 | 0.5961 | 0.5414 |

FIG. 6 further shows the box plots with beam display to show the detailed accuracy distribution of the 47 students under the $R^2GCN$, R-GCN (with E2N), and R-GCN (without E2N) models. The dots on the right of the boxes represent the students and their respective vertical positions denote the approximate accuracies. It can be seen that the $R^2GCN$ model achieved the best performance with the highest median accuracy, and had the least number of students whose accuracy was lower than 0.4, which indicated that extremely inaccurate cases were fewer.

Size of Labeled Data

Figure 7:
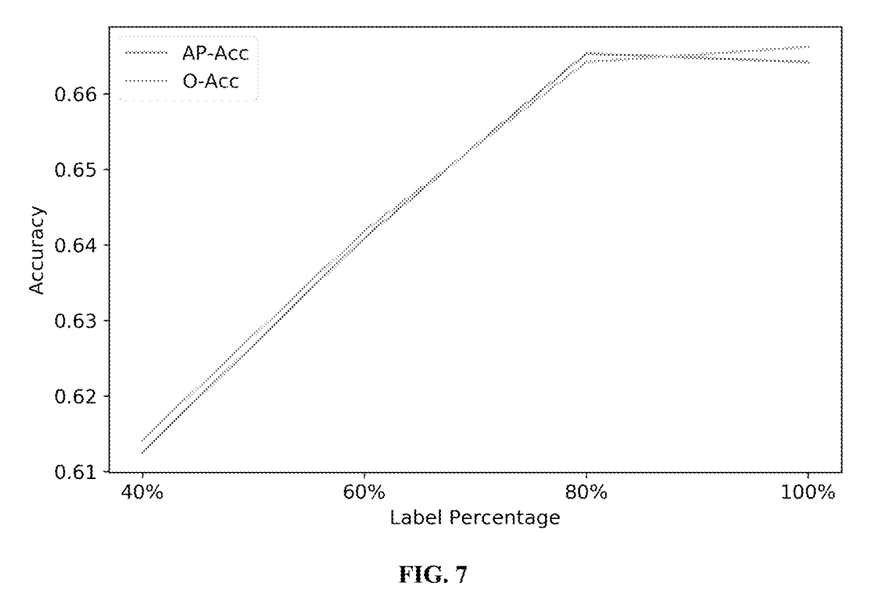
FIG. 7 depicts a chart of changes in prediction accuracies with the change in size of training labels of the R²GCN according to an embodiment of the present invention achieved in an experiment.

The influence of the training data size on the final prediction accuracy was further investigated. To maintain the consistency of network structure, test set and validation set, 40%, 60%, and 80% of training labels were kept in the training dataset in the experiment. The changes in AP–Acc and O–Acc achieved under the $R^2GCN$ model with the change of size in the training labels are shown in FIG. 7. It is easy to find that the prediction accuracy increased with the growing of training dataset size and finally reached a relative stable prediction accuracy around 0.66. This result was reasonable, since there were more ground-truth labels to guide the training of GNNs when more questions were finished.

Topological Distance Among Training, Validation and Test Set

Apart from the number of training labels, the student performance prediction could also be influenced by the topological distance between the test set and the training or validation set. Thus, the average shortest distances were calculated in the SIQ network among questions in the training dataset, test set, and validation set. These average distances are represented by $\bar{d}_{(train,test)}$, $\bar{d}_{(train,val)}$, and $\bar{d}_{(test,val)}$ respectively. Since the interaction nodes were derived from interaction edges, to simplify the analysis, those nodes were removed and the problem-solving network, such as that illustrated in in FIGS. 3A and 3B, was used to calculate shortest path distance with NetworkX. The average shortest distance is calculated as follows:

$$\bar{d}_{(X,Y)} = \frac{1}{\|X\|\|Y\|} \Sigma_{i \in \|X\|} \Sigma_{j \in \|Y\|} d_{(x_i, y_j)}; \quad (7)$$

where X and Y denote two sets of questions and $d_{(x_i,y_j)}$ is the shortest path distance between $x_i$ and $y_j$.

Figure 8:
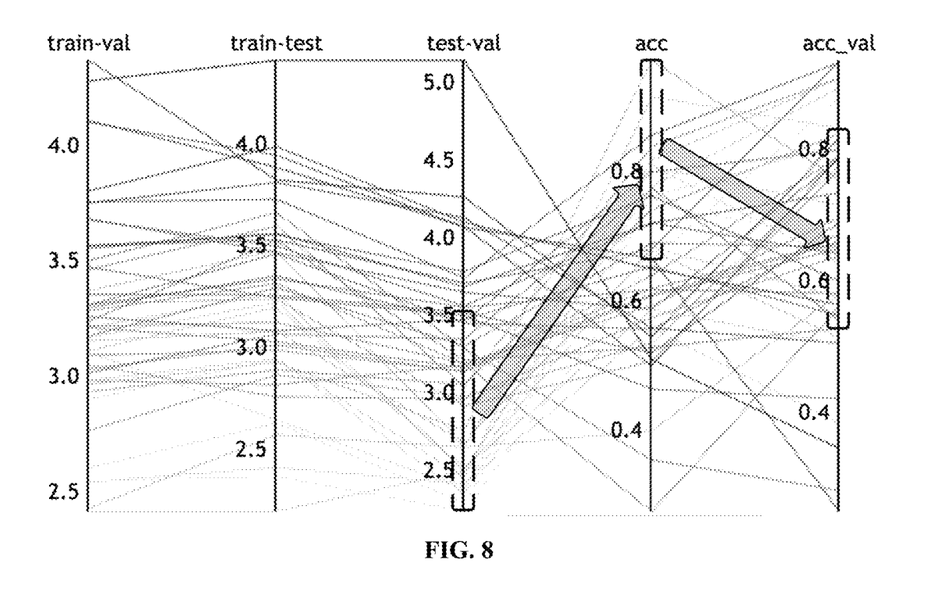
FIG. 8 depicts an illustrative graph of relationships between topological distance among training, validation, and test datasets, and prediction accuracies.

A parallel coordinates plot (PCP) was used to show the influence of the average distances on the student performance prediction accuracy, as shown in the FIG. 8. Five parallel y-axes are used to encode the three average distances and two accuracy scores (i.e., test accuracy and validation accuracy), respectively. Each line represents a student in the dataset. The light-to-dark color scheme is used to encode $\bar{d}_{(test,val)}$ with light lines indicating lower $\bar{d}_{(test,val)}$ and dark lines indicating high $\bar{d}_{(test,val)}$. It is easy to recognize that there was a negative correlation between the average distance from test to validation set $\bar{d}_{(test,val)}$ and the accuracy acc. Also, it can be noticed that the test accuracy of students with a larger $\bar{d}_{(test,val)}$ was usually lower than their validation accuracy. Such an observation is likely due to the large average distance between questions in the test set and the questions in the validation set, indicating the dissimilarity between them, making the early stopping point not always the best point of achieving the best test accuracy.

Long-Term Dataset

To further evaluate their effectiveness and generalizability, the performance of the experimented embodiment of the present invention was compared with the baseline methods on the long-term dataset that covered the problem-solving records of more students than the short-term dataset. The results in Table 5 below indicate that when the number of labeled data is limited, embodiments of the present invention can still achieve a high accuracy and F1 score.

TABLE 5

| Model | AP-Acc | O-Acc | APW-F1 |
| --- | --- | --- | --- |
| R²GCN | 0.5507 | 0.5671 | 0.5050 |
| R-GCN (with E2N) | 0.5100 | 0.5313 | 0.4605 |
| R-GCN (without E2N) | 0.5119 | 0.5296 | 0.4535 |
| GBDT | 0.4836 | 0.4610 | 0.3686 |
| SVM | 0.4973 | 0.4718 | 0.3801 |
| LR | 0.4881 | 0.4904 | 0.4322 |

The embodiments disclosed herein may be implemented using specifically configured computing devices, computer processors, or electronic circuitries including but not limited to digital signal processors (DSPs), graphical processing units (GPUs) application specific integrated circuits (ASICs), field programmable gate arrays (FPGAs), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer-readable media having computer execution instructions or software codes stored therein which can be used to configure the computing devices, computer processors, or electronic circuitries to perform any of the processes of the present invention. The computer-readable media can include, but are not limited to ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for autonomously predicting student performance in interactive question pools, comprising:
    Executing a data processing and feature extraction logical process execution module, comprising:
        receiving a plurality of historical student question-answer score data records of a plurality of students on an interactive question pool having a plurality of questions;
        receiving a plurality of pointing device movement data records containing data of one or more pointing device movements made by the students corresponding to the historical student question-answer score data records;
        extracting from historical student question-answer score data records:
            statistical student features reflecting the students' past performances on the questions; and
            statistical question features indicating a question popularity of each of the questions and the average students' scores on each of the questions; and
        extracting from the pointing device movement data records a plurality of interactive edge features representing one or more characteristics of the students' problem-solving behaviors;
    executing a network of nodes construction logical process execution module, comprising:
        performing an Edge2Node transformation to transform the interactive edge features into one or more interaction nodes; and
        constructing a heterogeneous student-interaction-question (SIQ) network of one or more student nodes from the statistical student node features, one or more question nodes from the statistical question node features, and the interaction nodes; and
    executing a prediction logical process execution module, comprising:
        processing the SIQ network by a residual relational graph neural network (R²GCN) to predict a student's score on one or more unattempt questions in the interactive online question pool;
        wherein the R²GCN comprises:
            one or more parallel input layers for feature transformation of different types of nodes in the SIQ network into nodes of same shape;
            one or more consequential relational graph neural network (R-GCN) layers for message passing;
            one or more residual connections to one or more hidden states, the statistical student features, statistical question features, and interaction edge features for capturing different levels of information; and an output layer for final prediction of a student's score on the unattempt questions in the interactive online question pool;

wherein the interactive edge features comprise:
time length between when a question is first shown to a student and when a first general click on the question is made by the student;
percentage of a time length of a first general click in an entire time length spent on answering a question by a student;
number of pointing device movement events when a question is first shown to a student and before a first general click on the question is made by the student;
percentage of pointing device movement events made when a question is first shown to a student and before a first general click on the questions is made by a student;
number of pointing device movement events made by a student on a question before the first general click ends;
total number of general clicks made on a question answered by a student;
average number of general clicks on made on a question answered by a student per second;
average time length between general clicks made on a question answered by a student;
median time length between general clicks made on a question answered by a student;
standard deviation of time length between general clicks made on a question answered by a student;
total pointing device trajectory length made by a student; and
point of time when a student answers a question;
wherein a general click is of a pair of necessary pointing device movement events in a pointing device movement trajectory when a student is interacting with a question.

2. The method of claim 1, wherein the statistical student features comprise:
number of a student's total trials made on the questions;
number of a student's second trials made on the questions;
percentages of a student's total trials on questions of certain mathematical dimension, grade, and difficulty; and
mean scores of a student's first trials on questions of certain mathematical dimension, grade, and difficulty.

3. The method of claim 1, wherein the statistical question features comprise:
a question's mathematical dimension;
a question's grade;
a question's difficulty;
total number of trials on a question made by the students;
total number of second trials on a question made by the students; and
percentage of trials made by the students on a question in each score level achieved by the students.

4. The method of claim 1, wherein the $R^2GCN$ further comprises:
a message function for transmitting and aggregating messages from all neighboring nodes to a center node of the SIQ network in the message passing;
an averaging function for reducing messages transmitted on same type of edges;
a summing for reducing messages transmitted on different type of edges;
an update function for updating a center node's hidden state after each of the R-GCN layers; and
a readout function for transforming a final hidden state to the final prediction.

5. An apparatus for autonomously predicting student performance in interactive question pools, comprising:
one or more computer-readable media; and
one or more processors that are coupled to the one or more computer-readable media and that are configured to execute:
a data processing and feature extraction logical process execution module for:
receiving a plurality of historical student question-answer score data records of a plurality of students on an interactive question pool having a plurality of questions;
receiving a plurality of pointing device movement data records containing data of one or more pointing device movements made by the students corresponding to the historical student question-answer score data records;
extracting from historical student question-answer score data records:
statistical student features reflecting the students' past performances on the questions; and
statistical question features indicating a question popularity of each of the questions and the average students' scores on each of the questions; and
extracting from the pointing device movement data records a plurality of interactive edge features representing one or more characteristics of the students' problem-solving behaviors;
a network of nodes construction logical process execution module for:
performing an Edge2Node transformation to transform the interactive edge features into one or more interaction nodes; and
constructing a heterogeneous student-interaction-question (SIQ) network of one or more student nodes from the statistical student node features, one or more question nodes from the statistical question node features, and the interaction nodes; and
a prediction logical process execution module for:
processing the SIQ network by a residual relational graph neural network ($R^2GCN$) to predict a student's score on one or more unattempt questions in the interactive online question pool;
wherein the $R^2GCN$ comprises:
one or more parallel input layers for feature transformation of different types of nodes in the SIQ network into nodes of same shape;
one or more consequential relational graph neural network (R-GCN) layers for message passing;
one or more residual connections to one or more hidden states, the statistical student features, statistical question features, and interaction edge features for capturing different levels of information; and
an output layer for final prediction of a student's score on the unattempt questions in the interactive online question pool;
wherein the interactive edge features comprise:
time length between when a question is first shown to a student and when a first general click on the question is made by the student;

percentage of a time length of a first general click in an entire time length spent on answering a question by a student;

number of pointing device movement events when a question is first shown to a student and before a first general click on the question is made by the student;

percentage of pointing device movement events made when a question is first shown to a student and before a first general click on the questions is made by a student;

number of pointing device movement events made by a student on a question before the first general click ends;

total number of general clicks made on a question answered by a student;

average number of general clicks on made on a question answered by a student per second;

average time length between general clicks made on a question answered by a student;

median time length between general clicks made on a question answered by a student;

standard deviation of time length between general clicks made on a question answered by a student;

total pointing device trajectory length made by a student; and point of time when a student answers a question;

wherein a general click is of a pair of necessary pointing device movement events in a pointing device movement trajectory when a student is interacting with a question.

6. The apparatus of claim 5, wherein the statistical student features comprise:

number of a student's total trials made on the questions;

number of a student's second trials made on the questions;

percentages of a student's total trials on questions of certain mathematical dimension, grade, and difficulty; and mean scores of a student's first trials on questions of certain mathematical dimension, grade, and difficulty.

7. The apparatus of claim 5, wherein the statistical question features comprise:

a question's mathematical dimension;

a question's grade;

a question's difficulty;

total number of trials on a question made by the students;

total number of second trials on a question made by the students; and percentage of trials made by the students on a question in each score level achieved by the students.

8. The apparatus of claim 5, wherein the $R^2GCN$ further comprises:

a message function for transmitting and aggregating messages from all neighboring nodes to a center node of the SIQ network in the message passing;

an averaging function for reducing messages transmitted on same type of edges;

a summing for reducing messages transmitted on different type of edges;

an update function for updating a center node's hidden state after each of the R-GCN layers; and a readout function for transforming a final hidden state to the final prediction.

* * * * *